United States Patent Office 3,848,056
Patented Nov. 12, 1974

3,848,056
MOLTEN ALKALINE ALKANOIC MIXTURES FOR ABSORPTION OF SULFUR OXIDES
Anthony G. Fonseca, Ponca City, Okla., assignor to Continental Oil Company, Ponca City, Okla.
No Drawing. Filed Sept. 5, 1972, Ser. No. 286,496
Int. Cl. B01d 47/00; C01b 17/00; B01j 9/04, 9/08, 9/12, 9/16, 9/20
U.S. Cl. 423—210.5          8 Claims

ABSTRACT OF THE DISCLOSURE

A method for removing sulfur oxides from gaseous streams containing said sulfur oxides by contacting said gaseous streams with an alkaline molten mixture containing metal alkanoates and metal hydroxides.

FIELD OF THE INVENTION

This invention relates to the recovery of sulfur oxides from gaseous mixtures containing said sulfur oxides. This invention further relates to the recovery of sulfur oxides as metal salts of said sulfur oxides, such that said metal salts may be converted into the corresponding metal carbonates and hydrogen sulfide which may be further converted into elemental sulfur.

PRIOR ART

In the combustion of organic fuels a frequent problem is that the combustion gases contain sulfur oxides as a by-product. Such sulfur oxides constitute a serious environmental pollutant and as a result much time and effort has been devoted in recent years to the development of methods whereby such sulfur oxides may be removed from gaseous mixtures containing sulfur oxides.

A variety of methods such as wet scrubbing catalytic oxidation, alkali alumina and dry char absorption processes have been developed. The state of the art in sulfur oxide removal is well illustrated by a series of articles published in Chemical Engineering Progress, vol. 65 at p. 62 in the August 1969 edition; p. 69 in the September 1969 edition; at p. 74 in the October 1969 edition and at p. 73 in the November 1969 edition.

The methods disclosed, while each has certain advantages, fail to satisfactorily solve the problem of removing sulfur oxides from gaseous mixtures. As a result much time and effort has been devoted to a continuing search for a method for removing such oxides from gaseous mixtures without the production of equally noxious by-products.

OBJECTS OF THE INVENTION

It is an object of the present invention to provide a method for selectively removing sulfur oxides from gaseous mixtures containing said oxides as well as carbon dioxide, carbon monoxide and other combustion products. It is a further object of the present invention to provide a method wherein said sulfur oxide may be selectively removed from gaseous mixtures without substantially reducing the temperature of the gaseous mixtures. It is a further objective of the invention to selectively remove sulfur oxides from gaseous mixtures in such a manner that the sulfur oxides may be converted into useful materials without the generation of other noxious by-products.

SUMMARY OF THE INVENTION

It has been found that the objectives of the present invention are achieved in a method for removing sulfur oxides from gaseous streams comprising: contacting said gaseous streams with a molten mixture having a pH greater than about 7.0 and consisting essentially of from about 10 to about 99 weight percent metal alkanoate, wherein said metal is selected from the group consisting of sodium, potassium, lithium and magnesium and wherein said alkanoate contains from about 1 to about 4 carbon atoms and from about 1 to about 90 weight percent metal hydroxide wherein said metal is selected from the group consisting of sodium, potassium, lithium and magnesium.

DESCRIPTION OF PREFERRED EMBODIMENTS

In the combustion of fossil fuels and the like for the generation of steam, electricity and the like it is frequently found that the combustion gases contain substantial quantities of sulfur oxides which constitute a serious environmental pollutant. It has now been found that sulfur oxides may be selectively absorbed from such gaseous mixtures by contacting said mixtures with a molten mixture having a pH greater than 7.0 and consisting essentially of from about 10 to about 99 weight percent metal alkanoate and from about 1 to about 90 weight percent metal hydroxide.

The metal alkanoate is selected from those materials wherein the metal is selected from the group consisting of sodium, potassium, lithium and magnesium and wherein the alkanoate portion contains from about 1 to about 4 carbon atoms. Particularly desirable results have been obtained wherein the metal is selected from the group consisting of sodium and potassium. Of these two, potassium is preferred. The alkanoate portion is selected from the group consisting of formates, acetates, propionates and the like. Particularly desirable results have been obtained when the alkanoate is selected from the group consisting of formate and acetate.

The metal alkanoate portion of the molten mixture may consist of a single metal alkanoate or mixtures wherein the metal portion is varied and the alkanoate portion is varied.

The metal hydroxide portion of the molten mixture is selected from the group consisting of sodium hydroxide, potassium hydroxide, lithium hydroxide and magnesium hydroxide. Particularly desirable results have been obtained wherein sodium hydroxide and potassium hydroxide were used. Most desirable results have been obtained wherein potassium hydroxide is used.

In the practice of the present invention the gaseous streams containing sulfur oxides are intimately contacted with the molten mixture thereby causing the sulfur oxides to be absorbed in said mixture and precipitated as metal salts of the sulfur oxides. The precipitated sulfur oxides are then readily removed by precipitation filtration, centrifuging, and the like for further processing. As sulfur oxides are absorbed in the molten mixture the pH tends to be reduced and must periodically be restored to a value above 7 by the addition of alkaline material. Suitable materials for raising the pH of the molten mixture are selected from the group consisting of metal hydroxides, metal carbonates and metal bicarbonates wherein the metal is selected from the group consisting of sodium, potassium, lithium and magnesium. Particularly desirable results have been obtained wherein the metal was selected from the group consisting of sodium and potassium and of these potassium is preferred.

It has been found that when the pH is maintained at a value greater than about 10 both sulfur oxides and carbon dioxide are absorbed in the molten mixture. Since it is undesirable that carbon dioxide be so absorbed since it does not constitute an environmental pollutant it is desirable that the pH be maintained between about 7.0 and about 10. At pH values between 7 and 10 it has been found that carbon dioxide is absorbed to a very slight degree whereas the sulfur oxides are absorbed to a very high degree up to the point at which the molten mixture becomes saturated with sulfur oxides.

It has been found that when the pH is lowered by the absorption of sulfur oxide it is necessary that alkaline material be added to restore the pH to a value greater than 7. At pH values greater than about 10 carbon dioxide is absorbed but upon further passage of gaseous mixtures containing sulfur oxides through the molten mixture the sulfur oxides tend to displace the carbon dioxide thus resulting in a net cumulation of minimal amounts of carbon dioxide. It is preferred in order that the absorption of carbon dioxide be maintained at a minimum that the pH be maintained at a value between about 8 and about 10. At such values it is observed that minimal carbon dioxide accumulation occurs whereas sulfur oxide absorption takes place readily.

It would be expected that in light of the fact that metal hydroxides are effective in absorbing sulfur oxides and carbon dioxides that both would be absorbed; however, as pointed out, within the particular pH range and the particular operating conditions defined only the sulfur oxides are absorbed. It was further surprisingly found that metal carbonates and bicarbonates may be used to return the pH to a value greater than 8 when the pH has been reduced by the absorption of sulfur oxide and the like. It is observed that above a given temperature which is apparently dependent upon the particular metal carbonate or bicarbonate used that the metal carbonate or bicarbonate decomposes by the release of carbon dioxide thus resulting in no net accumulation of carbon dioxide in the mixture even when metal carbonates and bicarbonates are used to increase the pH. Some specific examples of suitable metal bicarbonates and carbonates are $Na_2CO_3$, $NaHCO_3$, $MgCO_3$, $Li_2CO_3$, $K_2CO_3$, $KHCO_3$ and the like.

In light of this discovery it is observed that when the sulfur oxides are precipitated from the metal mixture as the metal salts that by means well known in the art such metal salts of sulfur oxides may be subjected to chemical treatments to convert the metal salts of sulfur oxides into hydrogen sulfide and the metal carbonates. The hydrogen sulfide is readily converted to elemental sulfur by means well known in the art such as the Claus process which is more fully described in British Pat. 686,469, issued Jan. 28, 1953 to Ramsey. The metal carbonates are useful as materials for addition to molten mixture to reduce the pH as required thus precipitating additional sulfur oxide compounds. It has been observed that in most instances a variety of sulfur oxides would be expected but as a result of the presence of oxygen in the flue gases and the like the primary sulfur oxide precipitated as the metal salt is sulfate. In any event the procedure discussed above is effective with other sulfur oxides and while it is expected that the salts of the sulfur oxides will consist of metal sulfates it is noted that other metal sulfur oxide salts behave in a similar manner. The gaseous streams may be contacted with the molten mixture in any suitable manner. For instance bubbling the gaseous stream through the molten mixture, contacting in spray contacting systems packed columns and the like are suitable methods. Such methods are well known in the art and the particular method to be used will be determined primarily by the end objectives of the user. The determination of such factors are well in the capability of those skilled in the art and need not be discussed further.

A particular advantage of the present invention is that the molten mixture may be maintained at any desired temperature above the melting point and below the decomposition temperature of the alkanoate material. Such temperatures will vary widely depending upon the particular alkanoate selected. In many instances it is desirable that the heat remaining with the gaseous stream containing a sulfur oxide be retained in the gaseous stream for effective operation of the flue mechanism used for venting the gaseous mixture. Temperatures up to at least 800° C. are possible by the use of the molten mixtures described although a preferred operating range is from about 140° C. to about 300° C.

The operating temperature is not critical to the method of the present invention so long as the operation is above the melting temperature of the particular metal alkanoate used so that a fluid liquid molten mixture is present. Many variations in metal alkanoate mixtures are possible and in fact the particular mixture to be chosen will in many instances be fixed by the temperature demands of the user.

In general it is desirable that the metal constituent of the hydroxide, carbonate or bicarbonate used to adjust the pH be the same as that used in the make-up of the metal alkanoate since the metal carbonate produced then may be recycled directly for pH adjustment. In the event that a two metal system is used in the formulation of the metal alkanoate it has been observed that the precipitated metal salt of the sulfur oxides contains varying ratios of the metals used so that the adjustment of the pH may also require analysis and adjustment of the respective metal contents. Such variations and modifications are within the scope of those skilled in the art and will not be discussed further.

It has been further observed that the molten metal alkanoate alone is effective for removing sulfur oxides but that the absorption of the sulfur oxides rapidly decreases the pH of the mixture to the extent that further absorption does not take place. Accordingly it is desirable that at least about 1 weight percent alkaline material be included to preserve the alkalinity of the mixture. Suitable hydroxides, oxides, carbonates and bicarbonates have been described hereinbefore and it has been found that most desirable results are obtained when from about 5 to about 25 weight percent alkaline material is included in the molten mixture.

Many variations and modifications are possible within the scope of the present invention and such variations and modifications may appear obvious or desirable to those skilled in the art based upon a review of the foregoing description of the embodiments and the following examples.

EXAMPLES

Example I

Tests were performed to demonstrate the effectiveness of the molten mixtures of the present invention in adsorbing primarily the sulfur oxides from gaseous mixtures containing sulfur oxides and carbon dioxide. A molten mixture containing about 91 weight percent potassium formate and about 9 weight percent potassium hydroxide was prepared. A gaseous mixture containing air and carbon dioxide was bubbled through the molten mixture at varying temperatures as shown below.

TABLE I

| Time (hr.): | Temperature (° C.) | $CO_2$ absorbed, wt. percent of mixture |
|---|---|---|
| 1 | 173 | 0.62 |
| 2 | 186 | 0.74 |
| 3 | 190 | 0.58 |
| 4 | 200 | 0.54 |
| 5 | 215 | 0.65 |
| 6 | 230 | 0.67 |

At a temperature of 150° C. (not shown) excess carbonate was formed but at temperatures in excess of about 165° C. no substantial carbon dioxide accumulation was observed.

Example II

The mixture of Example I was used to adsorb $SO_2$ by bubbling a gaseous mixture containing about 0.55 weight percent $SO_2$ and about 4.5 weight percent $CO_2$ with the balance being air through the mixture. Potassium hydroxide was added as necessary to maintain the pH between 8.0 and 10. The $SO_2$ retention is shown below in tabular form.

TABLE II

| Time (min.): | Temperature (° C.) | Weight percent of mixture S | $SO_2$ |
|---|---|---|---|
| 60 | 178 | 3.48 | 6.96 |
| 125 | 169 | 5.44 | 10.88 |
| 175 | 177 | 5.81 | 11.62 |
| 215 | 184 | 6.57 | 13.14 |
| 285 | 191 | 10.76 | 21.52 |
| 335 | | 11.69 | 23.38 |

The test was stopped after 335 minutes because the mixture was becoming thick as a result of the retained solid potassium sulfur oxide compounds present.

It has thus been shown that the molten mixtures of the present invention are effective in selectively absorbing sulfur oxides from streams containing $SO_2$ and $CO_2$.

Example III

A molten mixture containing about 48.8 weight percent sodium acetate, about 48.8 weight percent potassium acetate and about 2.4 weight percent potassium hydroxide was prepared. A mixture of 0.55 weight percent $SO_2$ and 4.5 weight percent $CO_2$ in air was bubbled through the mixture at the conditions shown below.

TABLE III

| Time (min.) | Temp. (° C.) | $CO_2$, wt. percent [1] | $SO_2$, wt. percent [1] | $SO_2$ (g.) | S, wt. percent [1] |
|---|---|---|---|---|---|
| 35 | 230 | 1.50 | 1.28 | 4.84 | 0.64 |
| 60 | 245 | 2.94 | 2.12 | 8.01 | 1.06 |
| 90 | 256 | 1.56 | 3.12 | 11.78 | 1.56 |
| 120 | 254 | 1.34 | 4.20 | 15.87 | 2.10 |
| 145 | 8 ml. of KOH [2] added—mixture pH 8.0 | | | | |
| 165 | 244 | 2.07 | 5.12 | 19.32 | 2.58 |
| 195 | 246 | 1.56 | 6.08 | 22.94 | 3.04 |

[1] Weight percent of the mixture.
[2] Aqueous 50 weight percent KOH solution.

At 195 minutes $SO_2$ was detected in the off gas from the melt and the test was discontinued.

Example IV

A test similar to Example III was run using a molten mixture containing about 47.6 weight percent sodium acetate, about 47.6 weight percent potassium acetate, about 2.4 weight percent sodium hydroxide and about 2.4 weight percent potassium hydroxide. The test conditions and results are shown below in Table IV.

TABLE IV

| Time (min.) | Temp. (° C.) | $CO_2$, wt. percent [1] | $SO_2$, wt. percent [1] | $SO_2$ (g.) | S, wt. percent [1] |
|---|---|---|---|---|---|
| 30 | 247 | 0.55 | 0.26 | 0.76 | 0.13 |
| 60 | 249 | 0.96 | 0.70 | 2.06 | 0.35 |
| 145 | 253 | 2.01 | 4.48 | 13.18 | 2.24 |
| 160 | 3.5 ml. of KOH [2] added | | | | |
| 180 | 248 | 1.52 | 4.84 | 14.23 | 2.42 |
| 245 | 3.5 ml. of KOH [2] added | | | | |
| 255 | 242 | 1.68 | 5.04 | 14.82 | 2.52 |
| 295 | 256 | 2.85 | 5.66 | 16.63 | 2.83 |
| 335 | 251 | 2.49 | 5.62 | 16.54 | 2.81 |

[1] Weight percent of the mixture.
[2] Aqueous 50 weight percent KOH solution.

Example V

A test similar to Example III was conducted using a mixture containing about 47.6 weight percent potassium acetate, about 47.6 weight percent sodium acetate and about 4.8 weight percent potassium hydroxide. The test conditions and results are shown in Table V below.

TABLE V

| Time (hrs.) | Temp. (° C.) | $CO_2$, wt. percent [1] | $SO_2$, wt. percent [1] | $SO_2$ (g.) | S, wt. percent [1] |
|---|---|---|---|---|---|
| 1 | 277 | 0.91 | 0.10 | 0.38 | 0.05 |
| 2 | 286 | 0.92 | 0.66 | 2.53 | 0.33 |
| 3 | 290 | 0.43 | 0.80 | 3.07 | 0.40 |
| 4 | 287 | 0.49 | 1.25 | 4.84 | 0.63 |
| 5 | 286 | 0.37 | 1.68 | 5.87 | 0.84 |
| 6 | 282 | 0.30 | 1.88 | 7.22 | 0.94 |
| 7 | 286 | 0.49 | 2.04 | 7.84 | 1.02 |
| 8 | 287 | 0.28 | 2.40 | 9.22 | 1.20 |
| 9 | 289 | 0.50 | 2.72 | 10.42 | 1.36 |
| 10 | 290 | 0.45 | 2.46 | 9.45 | 1.23 |

[1] Weight percent of the mixture.

Examples III, IV and V demonstrate the effectiveness of the molten mixtures of the present invention in removing sulfur oxides from streams containing sulfur oxides, carbon dioxide and air.

Example VI

A molten mixture consisting of about 45.5 weight percent lithium formate, about 45.5 weight percent potassium formate, about 4.5 weight percent lithium carbonate and about 4.5 weight percent potassium carbonate was prepared. A gas stream containing 0.55 weight percent $SO_2$ and 4.5 weight percent $CO_2$ with the balance being air was bubbled through 130 cc. of the mixture at the rate of 2000 cc./min. for seven hours. The mixture then contained 5.3 weight percent $SO_2$ and 2.1 weight percent $CO_2$. X-ray analysis showed the sulfur as $LiKSO_4$.

It is thus shown that metal carbonates are useful for maintaining the alkalinity of the mixture as well as the metal hydroxides. It was further observed that little or no $CO_2$ or carbonate buildup occurred until the pH exceeded 10 and that at pH values greater than 10 a carbonate precipitate began to form but upon using such solutions the $SO_2$ serves to reduce the pH of the solution below 10 as it is absorbed and redissolve the carbonate precipitates.

What is claimed is:

1. A method for removing sulfur oxides from gaseous streams comprising: contacting said gaseous streams with a molten mixture having a pH from about 7.0 to about 10.0 and containing from about 10 to about 99 weight percent metal alkanoate, wherein said metal is selected from the group consisting of sodium, potassium, lithium and magnesium, and wherein the alkyl moiety of said alkanoate contains from 1 to about 4 carbon atoms; and from about 1 to about 90 weight percent of an alkaline material selected from the group consisting of metal hydroxides, metal carbonates, metal bicarbonates and combinations thereof wherein said metal is selected from the group consisting of sodium, potassium, lithium and magnesium thereby selectively absorbing sulfur oxides and recovering a gaseous stream having a reduced sulfur oxide content.

2. The method of Claim 1 wherein the pH of said molten mixture is maintained within said range by the addition of said alkaline material.

3. The method of Claim 2 wherein said alkaline material is selected from the group consisting of metal carbonates and metal bicarbonates wherein said metal is selected from the group consisting of sodium, potassium, lithium and magnesium.

4. The method of Claim 2 wherein said alkaline material is selected from the group consisting of metal hydroxides wherein said metal is selected from the group consisting of sodium, potassium, lithium and magnesium.

5. The method of Claim 1 wherein said molten mixture contains from about 5 to about 25 weight percent of said alkaline material.

6. The method of Claim 1 wherein said metal alkanoate and said alkaline material contain the same metal or mixture of metals in the metal portion.

7. The method of Claim 1 wherein said alkanoate is selected from the group consisting of formate, acetate, propionate and mixtures thereof.

8. The method of Claim 1 wherein said sulfur oxides are removed from said molten mixture as a precipitate of salts of said sulfur oxides of said metals, reduced to the corresponding metal sulfides and thereafter contacted with water and carbon dioxide to convert said metal sulfides to metal carbonates and hydrogen sulfide.

References Cited
UNITED STATES PATENTS

| | | | |
|---|---|---|---|
| 3,687,615 | 8/1972 | Gorin et al. | 423—243 |
| 3,690,824 | 9/1972 | Gorin et al. | 423—244 |
| 1,878,682 | 9/1932 | Dow | 423—244 |
| 3,574,544 | 4/1971 | Heredy et al. | 423—242 |
| 3,438,734 | 4/1969 | Grantham et al. | 423—242 |
| 3,574,545 | 4/1971 | Grantham | 423—242 |

OSCAR R. VERTIZ, Primary Examiner

G. A. HELLER, Assistant Examiner

U.S. Cl. X.R.

423—244, 428